United States Patent [19]

De Waal

[11] Patent Number: 5,165,736
[45] Date of Patent: Nov. 24, 1992

[54] CORNER PROFILE FOR COUPLING CHANNEL MEMBERS

[76] Inventor: Casparus W. De Waal, Leembaan 21, 5753 CW Deurne, Netherlands

[21] Appl. No.: 605,484

[22] Filed: Oct. 30, 1990

Related U.S. Application Data

[62] Division of Ser. No. 419,711, Oct. 11, 1989, Pat. No. 4,989,314.

[51] Int. Cl.⁵ .............................................. F16L 23/00
[52] U.S. Cl. .................................... 285/424; 285/363
[58] Field of Search ....................... 285/363, 414, 424

[56] References Cited

U.S. PATENT DOCUMENTS

| | | | |
|---|---|---|---|
| 3,630,549 | 12/1971 | Grimm | 285/424 X |
| 4,218,079 | 8/1980 | Arnoldt | 285/424 X |
| 4,244,609 | 1/1981 | Smitka | 285/424 X |
| 4,558,892 | 12/1985 | Daw et al. | 285/424 X |

FOREIGN PATENT DOCUMENTS 2082282 3/1982 United Kingdom ................ 285/414

Primary Examiner—David H. Corbin
Attorney, Agent, or Firm—Wegner, Cantor, Mueller & Player

[57] ABSTRACT

A profile for the coupling of adjoining channel members comprises a front wall for extending perpendicularly from a wall of the channel member, a back wall extending at least partially parallel to the front wall, a front flange connected to the front wall, a back flange connected to the back wall and a deformable sealing material in the space between the front wall, the back wall and the flanges. The profile is constructed by folding a strip of material along parallel fold lines. A deformable sealing material is applied to the strip, and when the strip is folded, the sealing material is deformed so as to fill a substantial portion of the space between the front wall, the back wall, the front flange and the back flange of the profile.

3 Claims, 2 Drawing Sheets

CORNER PROFILE FOR COUPLING CHANNEL MEMBERS

This application is a divisional of Ser. No. 07/419,711, filed Oct. 11, 1989, now U.S. Pat. No. 4,989,314.

The present invention relates to a method for manufacturing a corner profile for the butting coupling of channels conducting gaseous media, and having a rectangular or square cross section, and which profile comprises a front wall extending perpendicular to the wall of the channel; a back wall extending completely or partially parallel thereto, and two flanges each connected with the front wall of the back wall, respectively. Such profiles are used to connect adjoining channel members. The profiles are connected with the four walls of the channel through any fitting connection means, and subsequently hook shaped means are inserted into the corners, which are mutually connected by means of bolts, for example.

The problem with such a connection is to avoid a leak along the profiles or the wall and the hook shaped corner pieces where cement or cemented strip is often used. The principal locations of leaks are in the corners but also along the flanges which are on both sides against the wall of a part of a channel.

From DE-A-2.221.312 it is already known to apply a layer of cement at the inner side of the profile which encloses the edge of the tunnel wall. This avoids a part of the leaking along the front edge of the channel parts, but not along the hook shaped corner pieces.

The aim of the invention is to alleviate said disadvantage and it provides a method, which is distinguished from prior art in that departing from a flat strip, a strip is folded according to parallel lines. The strip is folded such that the front wall and the back wall are parallel, wherein a ridge of flexible material is applied to said strip before this folding process takes place, which ridge has such a shape that said folding process causes a deformation of said ridge.

Such a method ensures that a substantial part of the space between the front wall and the back wall is completely filled with sealing material so that a complete sealing is obtained with the insertion of edges of the channel walls but also with the legs of the hook shaped corner pieces.

The ridge of deformable material can be sprayed onto the strip but according to the invention it can also be peeled from a spool as a intermediate product and then applied on the strip. The application can take place by means of temporary gluing means, for instance a gluing strip.

Further the method relates to the corner profile obtained with the method mentioned above, which profile comprises a front wall extending perpendicular to the channel wall, a back wall being completely or substantially parallel therewith and two flanges connected with the front wall and the back wall respectively, and which has been turned therefrom and which the space bounded by the front wall, the back wall and the flanges contains a strip of sealing material of foamed plastic.

Subsequently the present invention will be illucidated in the following description of the drawings of a preferred embodiment.

DESCRIPTION OF THE PREFERRED EMBODIMENTS

Figure 1A:
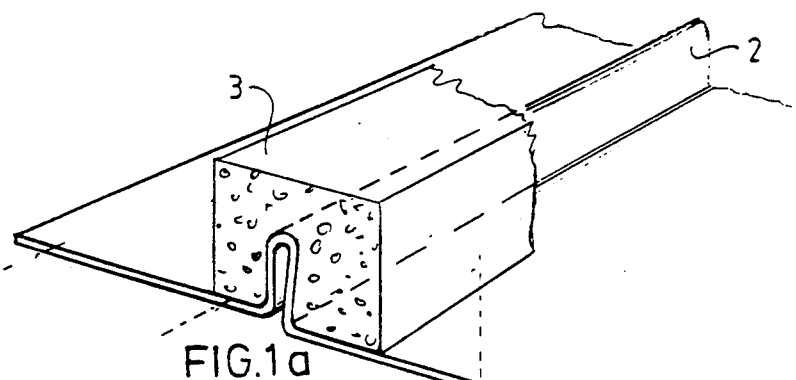
FIGS. 1a, b, c, show several stages in the preparation of a profile according to the invention departing from a flat strip and comprising a ridge of deformable sealing material.

In FIG. 1a, there is shown a flat strip 1 of material which beforehand has been provided with a folding line 2. The strip of material can have any length and can be peeled from a spool of the material. In the shown embodiment surrounding the folding line 2 a ridge of sealing material 3 is applied, which can take place by spraying or by applying a peeled strip of foamed plastic material, for example.

Figure 1B:
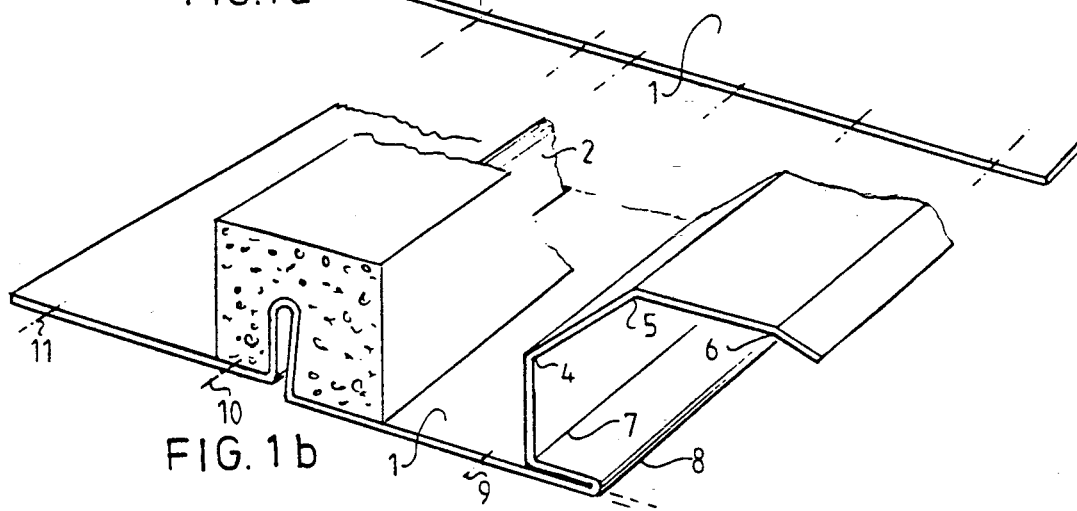

Subsequently the strip 1 can be folded further according to FIG. 1b along folding lines which are parallel to folding line 2, for instance lines 4, 5 and 6. After the folding along the lines 7 and 8 the intermediate product according to FIG. 1b is obtained.

Subsequently lines 9, 10, 11 can be folded, resulting in the product according to FIG. 1c. It will be clear that in these last folding processes the edge of sealing material 3 is deformed to a substantial triangular shape, and in which the material is biased into the space between the walls 12 and 13 and the flanges 14 and 15 respectively.

Figure 1C:
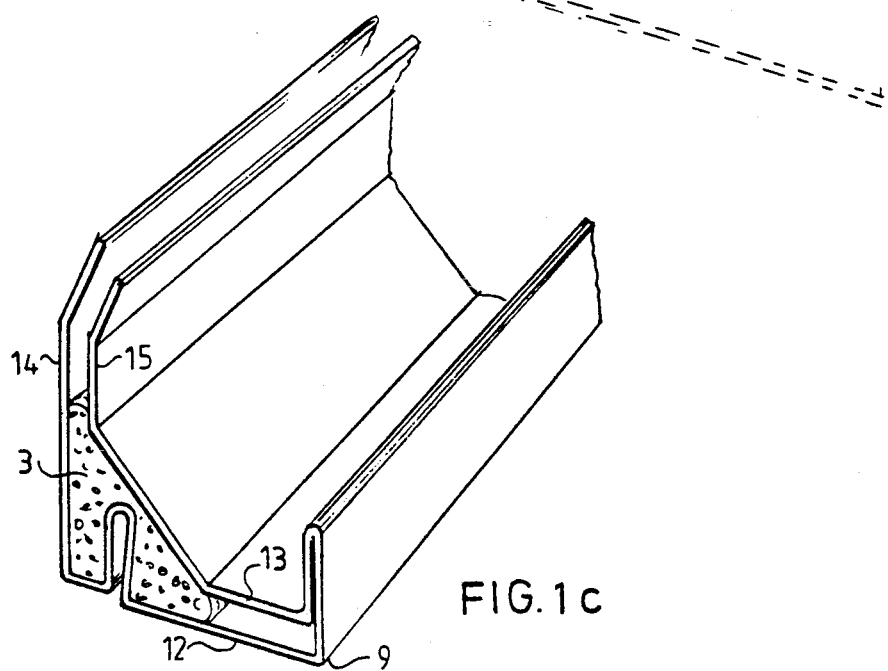
Figure 2:
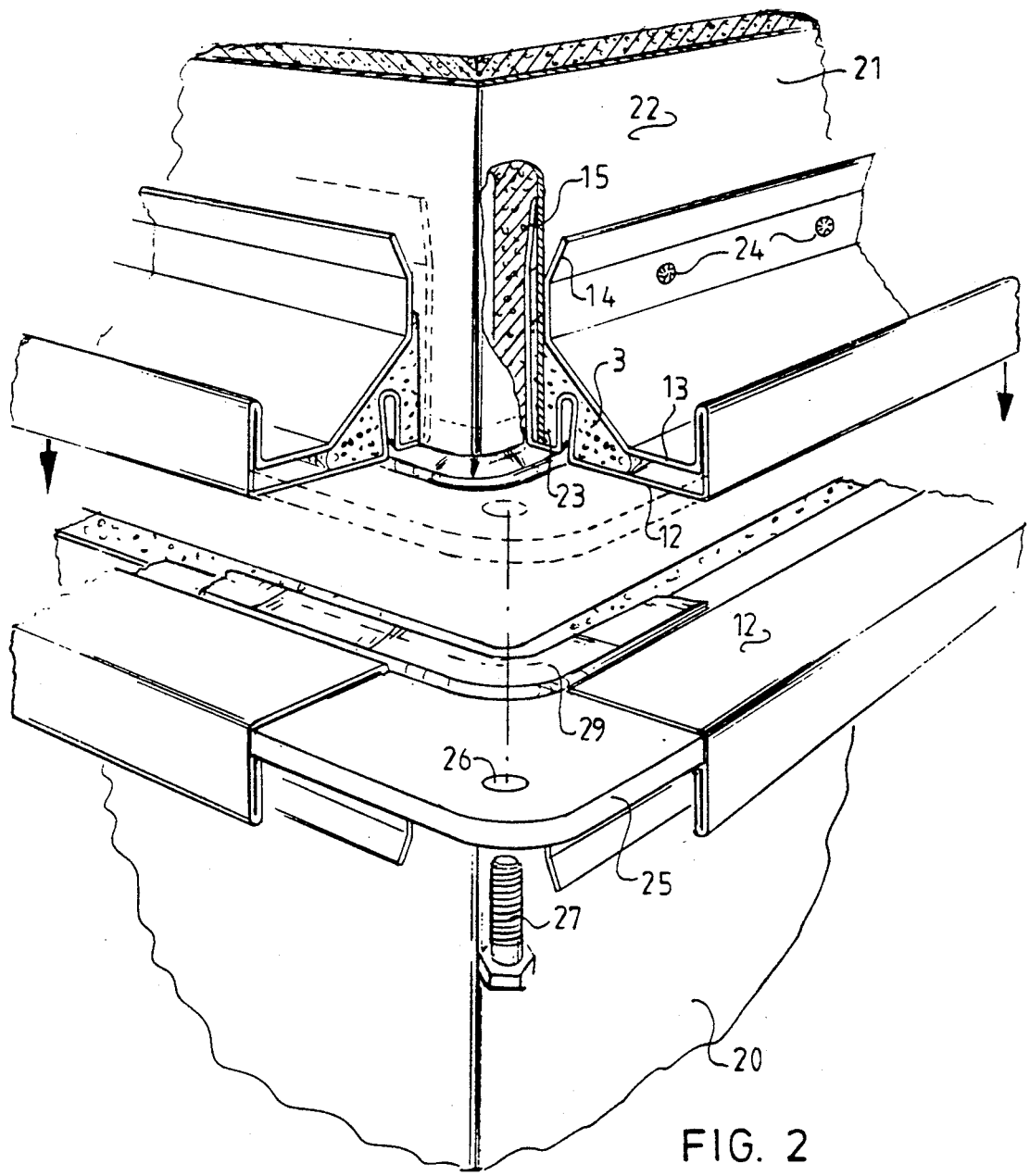
FIG. 2 is a perspective view of a butted connection of two channel parts comprising the profile according to FIG. 1.

The profile according to FIG. 1c thus obtained can be used in the butting connection of channel parts 20, 21 in FIG. 2. Therefore a profile according to FIG. 1c is conveyed alongside the walls 22 of the channel parts with the flanges 14, 16, wherein the front edge 23 of the wall is biased into the foamed plastic material 3. A permanent fixing of the profile on the wall can be obtained by the use of local welds 24, for example. The profiles according to FIG. 1c have been previously formed to a frame by means of hook shaped corner pieces 25 comprising a bolt hole 26. Each hook piece 25 comprises a leg which is inserted into the space between the front 12 and back walls 13 of the profile. The inner edge of the leg of the corner piece 25 touches the sealing means 3 in the space between said front and said back walls 12, 13. It is noted that in the left hand side in FIG. 2 the corner piece 25 has been eliminated for reasons of illustration, but should be present as is indicated by the dotted line.

For good sealing a sealing strip 29 is applied against the front wall 12 and the front side of the corner piece 25, so that after the closing of the channel parts 20, 21 against each other by means of the bolt 27 in the bolt holes 26, a permanent connection between the channel parts can be obtained. A gastight seal is insured by the sealing strip 29 alongside the end planes of the connection being formed by the front walls 12 and the front plane of the corner piece 25, and by the sealing material 3. This forms a seal between the flanges 15, 14 and the wall 22 of the channel parts 21 and 20, which avoids possible leaks at the corner piece 25 and line transition between the profiles of FIG. 1c and the corner pieces 25.

Due to the predeformation of the sealing material 3, for example foam plastic, a seal is insured for a longer period of time.

I claim:

1. A profile for the coupling of adjoining channel members, said adjoining channel members forming a substantially rectangular passage through which a gaseous medium is conveyed, wherein each of said adjoining channel members comprises a channel wall, said profile comprising:
- a first wall for extending perpendicularly from the channel wall of one of the channel members;
- a second wall extending at least partially parallel to said first wall;
- a first flange for placement adjacent to said channel wall of said one of the channel members, said first flange connected to and extending substantially perpendicular from said first wall;
- a second flange connected to said second wall, said first flange and said second flange forming a space therebetween for receiving the channel wall of said one of the channel members,
- wherein said first wall includes a first substantially rectangular planar surface in the vicinity of said first flange, a second substantially rectangular planar surface, and a folded ridge connecting an edge of each of said first and second substantially rectangular planar surfaces and projecting towards said second wall; and
- a preformed gasket of deformable sealing material surrounding said folded ridge and filling a substantial portion of a space between the first wall, the second wall, the first flange and the second flange, while leaving sufficient room between said second substantially rectangular planar surface and said second wall for subsequent reception of a leg or a corner member.

2. The profile according to claim 1, wherein said folded ridge has a substantially U-shaped cross-sectional shape.

3. A profile for the coupling of adjoining channel members, said adjoining channel members forming a substantially rectangular passage through which a gaseous medium is conveyed, wherein each of said adjoining channel members comprises a channel wall, said profile comprising:
- a first wall of extending perpendicular from the channel wall of one of the channel members;
- a second wall extending at least partially parallel to said first wall;
- a first flange for placement adjacent to said channel wall of said one of the channel members, said first flange connected to and extending substantially perpendicular from said first wall;
- a second flange connected to said second wall, said first flange and said second flange spaced apart sufficiently to receive therebetween the channel wall of said one of the channel members,
- wherein said first wall includes a first substantially rectangular planar surface in the vicinity of said first flange, a second substantially rectangular planar surface, and a folded ridge connecting an edge of each of said first and second substantially rectangular planar surface and projecting towards said second wall; and
- a preformed gasket of deformable sealing material filling a substantial portion of a space between said first substantially rectangular planar surface, said folded ridge, said second wall, said first flange and said second flange, and said gasket being in engagement with said second wall,
- whereby shifting of said gasket within said space is prevented by said engagement with said second wall.

* * * * *